United States Patent [19]

Kondo

[11] 4,266,635

[45] May 12, 1981

[54] BRAKING DEVICE

[75] Inventor: Masahiko Kondo, Osaka, Japan

[73] Assignee: V.I.V. Engineering Co., Ltd., Japan

[21] Appl. No.: 53,208

[22] Filed: Jun. 29, 1979

[51] Int. Cl.³ ............................................. F16D 51/00
[52] U.S. Cl. .................................................. 188/82.84
[58] Field of Search ................... 188/82.8, 82.2, 82.84, 188/134, 136; 192/45

[56] References Cited

U.S. PATENT DOCUMENTS

| | | | |
|---|---|---|---|
| 2,569,108 | 9/1951 | Koch | 188/82.84 |
| 3,662,867 | 5/1972 | Kinsbach | 188/82.8 X |

*Primary Examiner*—Duane A. Reger
*Attorney, Agent, or Firm*—Wenderoth, Lind & Ponack

[57] ABSTRACT

A braking device including a rotor affixed to a shaft of a rotary machine and said rotor and having concavities angularly spaced about its periphery, a brake drum enclosing the rotor, and rollers interposed between the rotor and the brake drum. The rollers are adapted for planetary motion around the axis of the rotor when the brake drum is concentric with the rotor, and said rollers adapted to be locked between the rotor and the internal surface of the brake drum when the brake drum is in the eccentric position with respect to the rotor.

5 Claims, 3 Drawing Figures

BRAKING DEVICE

The present invention relates to a braking device.

Generally, a great force was required for an operator to apply a strong braking power with conventional braking devices, irrespective of whether they employ brake shoes, brake bands or disks.

It is an object of the present invention to provide a braking device which requires a relatively little force to develop strong braking power.

It is another object of the present invention to provide a braking device which requires only a simple operation to develop a strong braking power.

With these objects in view which will become apparent from the following detailed description, the present invention will be more clearly understood in connection with the accompanying drawings, in which.

Figure 1:
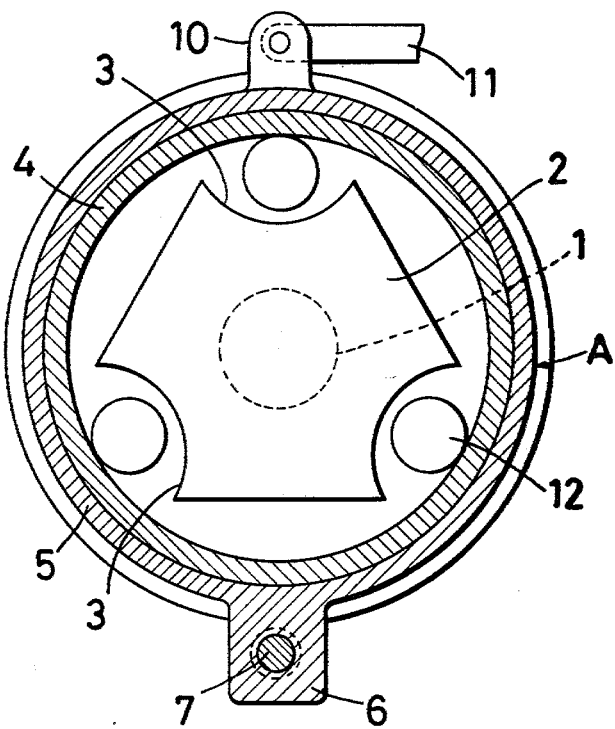
FIG. 1 is a vertical sectional front view of a braking device in accordance with the present invention, with a brake drum in a concentric position with the rotor.
Figure 2:
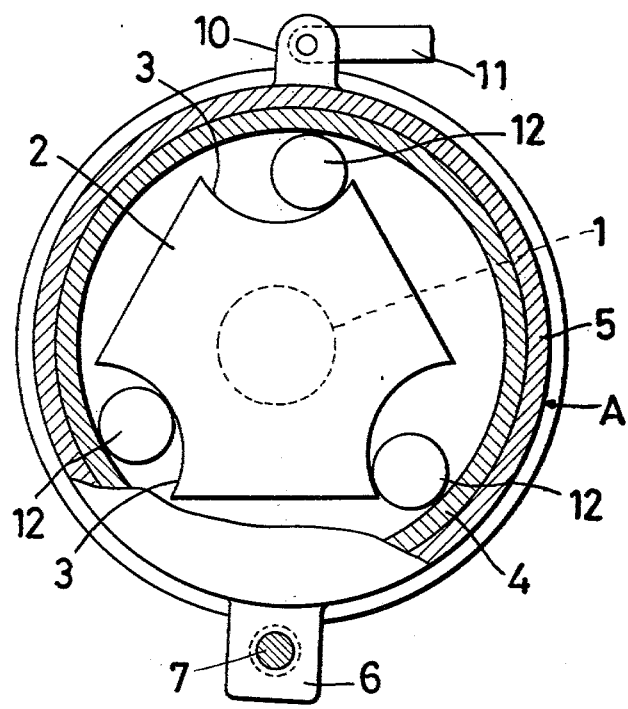
FIG. 2 is a view similar to FIG. 1 but with the brake drum in an eccentric position with respect to the rotor.

Referring now to FIGS. 1 and 2, a braking device in accordance with the present invention includes a brake drum A and a rotor 2, the latter being fixed to one end of a shaft or hub 1 of a rotary machine coaxially therewith. The vertical section of the rotor 2 taken perpendicularly with respect to the axis of rotation is in the shape of an equilateral triangle with all of its vertexes chipped off so as to form arc-shaped or shallow V-shaped concavities 3, each of said concavities having an axis of symmetry perpendicular to the axis of rotation of said shaft.

The brake drum A comprises an inner race 4 and an outer race 5 in which the inner race 4 slidably fits. A roller 12 is interposed between the internal surface of the inner race 4 and each of the concavities 3 of the rotor 2 in such a manner that, while the brake is off, a sufficient space is left both between the roller 12 and the inner race 4 and between the roller 12 and the rotor 1.

The outer race 5 is in a dish-like shape and formed with a downward projection 6 at its bottom. A hole with an axis parallel to the axis of the rotor 2 is provided in the center of the projection 6, in which a bolt 7 is inserted and screwed into some suitable part of a frame 8 of the rotary machine. The bolt 7 serves as a fulcrum about which the brake drum A sways.

Figure 3:
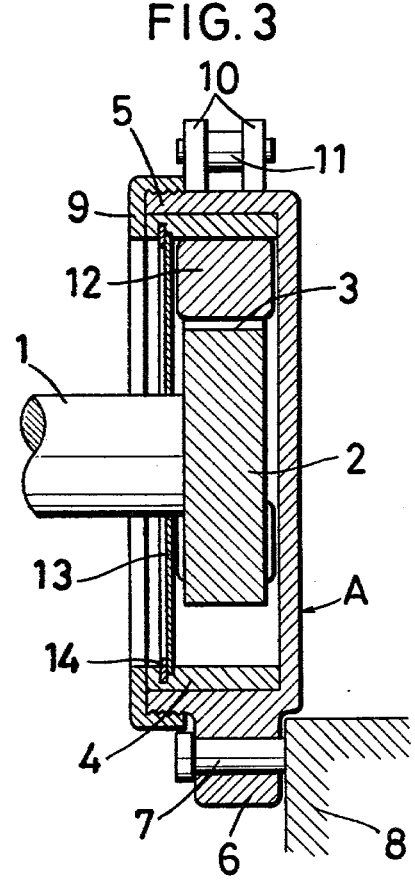
FIG. 3 is a vertical sectional side view of the same.

Referring now to FIG. 3, a lid 9 provided with a hole fits on the hub 1 and is applied to the outer race 5 so as to prevent the inner race 4 from getting out of the brake drum A.

A circular side plate 13 provided with a hole also fits on the hub 1 and is mounted in the inner race 4 so as to prevent the rollers 12 from getting out of the brake drum A. The peripheral edge of the side plate 13, together with a retaining ring 14 by which the side plate 13 is held in place, fits in an annular groove formed in the internal surface of the inner race 4.

By means of a coupling pin, one end of a connecting rod 11 is connected to upward projections 10 formed on top of the outer race 5. The other end of the connecting rod 11 is connected to a hand level or a brake cylinder (not shown). When the hand lever is moved or the brake cylinder is actuated, the brake drum A sways about the bolt 7 and deviates from the concentric position with respect to the rotor 2.

When the brake drum A is in the concentric position with the rotor 2 as shown in FIG. 1, the rotation of the rotor 2 on its axis merely causes the revolution of the rollers 12 around the axis of the rotor 2, and the latter is not in the least a hindrance to the former.

When the connecting rod 11 is pulled rightwardly as shown in FIG. 2, the brake drum A sways clockwise about the bolt 7 and deviates from the concentric position with the rotor 2. As a consequence, the rollers 12 are held tightly between the rotor 2 and the inner race 4. Indirect but tight contact thus established between the rotor 2 and the inner race 4 through the rollers 12 tends to cause the rotation of the inner race 4 with the rotor 2. On the other hand, as a result of the connecting rod 11 being pulled rightwardly the inner race 4 comes into uneven contact with the outer race 5. The resistance thus produced by the friction between the inner race 4 and the outer race 5, which is in proportion to the intensity of the eccentric load applied to the brake drum A, constitutes a force for damping the rotor 2. Since the sliding friction between the inner race 4 and the outer race 5 serves to prevent the rotor 2 from abruptly undergoing the strong damping force, the braking device in accordance with this invention is suited for a light-duty machine liable to be damaged by the emergency brake abruptly applied to the shaft 1.

By way of another embodiment of the present invention, the brake drum A may be of an integral structure instead of comprising the inner race 4 and the outer race 5. When the brake drum A of this structure is forced to deviate from the concentric position with the rotor 2, the rollers 12 are tightly locked between the rotor 2 and the internal surface of the brake drum A. As compared with the braking device in accordance with the first embodiment, the second embodiment is suited especially for a heavy-duty machine which is perfectly proof against the shock to be caused by an abrupt application of a brake.

Thus the present invention has the advantage of permitting extremely simple operation and requiring relatively little force by the operator to effect braking device to develop strong braking power.

It is to be noted that balls may be used in place of the rollers 12 and that more than three concavities 3 may be angularly spaced about the periphery of the rotor 2.

It is also to be noted that the downward projection 6, bolt 7, upward projections 10 and connecting rod 11 may be replaced with other suitable means for causing the brake drum A to deviate from the concentric position with the rotor 2.

While I have disclosed a few embodiments of the present invention, it is to be understood that they have been given by way of example only and not in a limiting sense, the scope of the present invention being determined by the objects and the claims.

What I claim is:

1. A braking device comprising a rotor coaxially affixed to a shaft of a rotary machine, said rotor having a plurality of concavities about the outer periphery thereof, each of said concavities having an axis of symmetry perpendicular to the axis of rotation of said shaft, a brake drum enclosing said rotor, said drum having a concentric and an eccentric position with respect to said rotor, a roller bearing means interposed between the internal surface of said brake drum and each of said concavities in the rotor and adapted for planetary motion around the axis of said rotor when said brake drum is in the concentric position with respect to said rotor and adapted to be locked between said rotor and said brake drum when said brake drum is moved to the eccentric position with respect to said rotor, and means for moving said brake drum to and from said concentric and eccentric positions.

2. The braking device as set forth in claim 1, wherein the cross section of said rotor is in the shape of an equilateral triangle with all of its vertexes chipped off so as to form said concaves.

3. The braking device as set forth in claim 1, wherein said brake drum comprises an inner race and an outer race in which said inner race slidably fits.

4. The braking device as set forth in claim 1, wherein said roller bearing means comprises a ball.

5. The braking device as set forth in claim 1 wherein said roller bearing means comprises a roller.

* * * * *